United States Patent

Jung et al.

[11] Patent Number: 5,835,660
[45] Date of Patent: Nov. 10, 1998

[54] OPTICAL FIBRE CLAMPING DEVICE

[75] Inventors: Roger Erwin Jung, Chingford; Brian Gregory, Canvey Island; Peter David Jenkins, Woodbridge; Simon Charles Triston Benton, Felixstowe, all of United Kingdom

[73] Assignee: GPT Limited, United Kingdom

[21] Appl. No.: 625,549

[22] Filed: Apr. 1, 1996

[30] Foreign Application Priority Data

Mar. 30, 1995 [GB] United Kingdom ............ 9506505

[51] Int. Cl.6 ............................... G02B 6/36
[52] U.S. Cl. ............................ 385/137; 385/135
[58] Field of Search ..................... 385/134, 135, 385/136, 137

[56] References Cited

U.S. PATENT DOCUMENTS

| 4,775,018 | 10/1988 | Heng et al. ............ 350/96.21 |
| 4,927,227 | 5/1990 | Bensel, III et al. ............ 350/96.2 |
| 5,222,179 | 6/1993 | Auteri ............ 385/114 |
| 5,479,554 | 12/1995 | Roberts ............ 385/135 |
| 5,535,298 | 7/1996 | Fasnacht et al. ............ 385/135 |
| 5,596,670 | 1/1997 | Debortoli et al. ............ 385/135 |

FOREIGN PATENT DOCUMENTS

| 0 151 690 | 8/1985 | European Pat. Off. |
| WO 95/07484 | 3/1995 | WIPO |

Primary Examiner—John Ngo
Attorney, Agent, or Firm—Kirschstein, et al.

[57] ABSTRACT

In an optical fibre clamping device to prevent relative movement between an optical fibre and a tube within which the optical fibre is located, a body part includes a through passageway to receive the optical fibre. The body part includes a first clamp to engage the tube and a second clamp to engage the optical fibre.

6 Claims, 3 Drawing Sheets

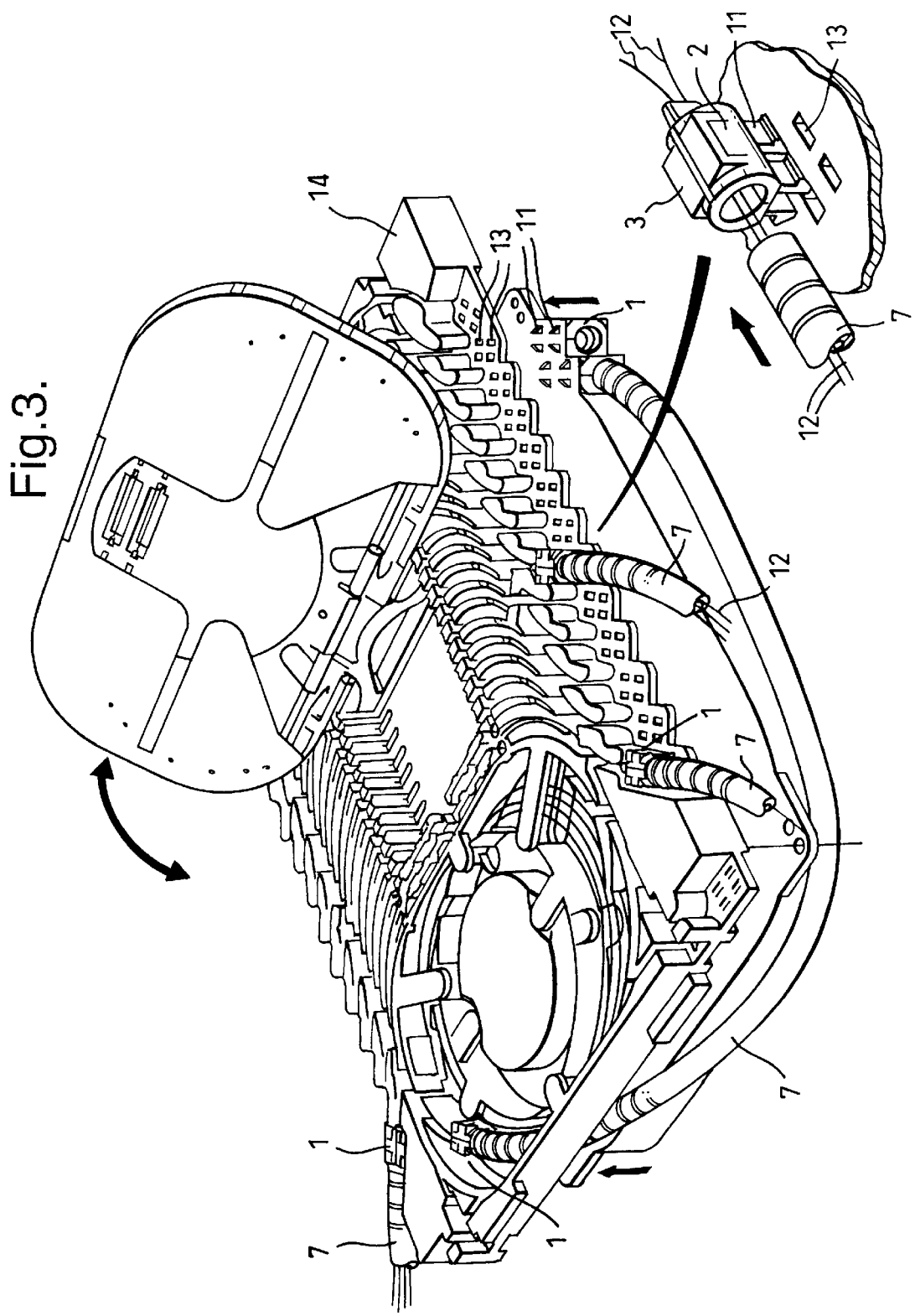

OPTICAL FIBRE CLAMPING DEVICE

TECHNICAL FIELD OF THE INVENTION

This invention relates to an optical fibre clamping device in particular for preventing relative movement between an optical fibre and a protective tube within which the optical fibre is located.

BACKGROUND ART

There is frequently a need within optical fibre communications networks to splice optical fibres together. It is known to use so called organiser trays or plates which accommodate a large number of optical fibres which are spliced together within the tray. Each optical fibre is conventionally housed within a protective bend limiting tube and the present invention is an attempt to provide some means of preventing relative movement between the optical fibre and the tube.

SUMMARY OF THE INVENTION

According to the invention the device comprises a body part including a through passageway to receive the optical fibre, the body part including a first clamp to engage the tube and a second clamp to engage the optical fibre.

BRIEF DESCRIPTION OF THE DRAWINGS

An embodiment of the invention will now be described by way of example with reference to the accompanying drawings, in which;

FIG. 3 is a perspective view of an optical fibre organiser designed to be used with the devices shown in FIGS. 1 and 2.

DETAILED DESCRIPTION OF THE INVENTION

Figure 1:
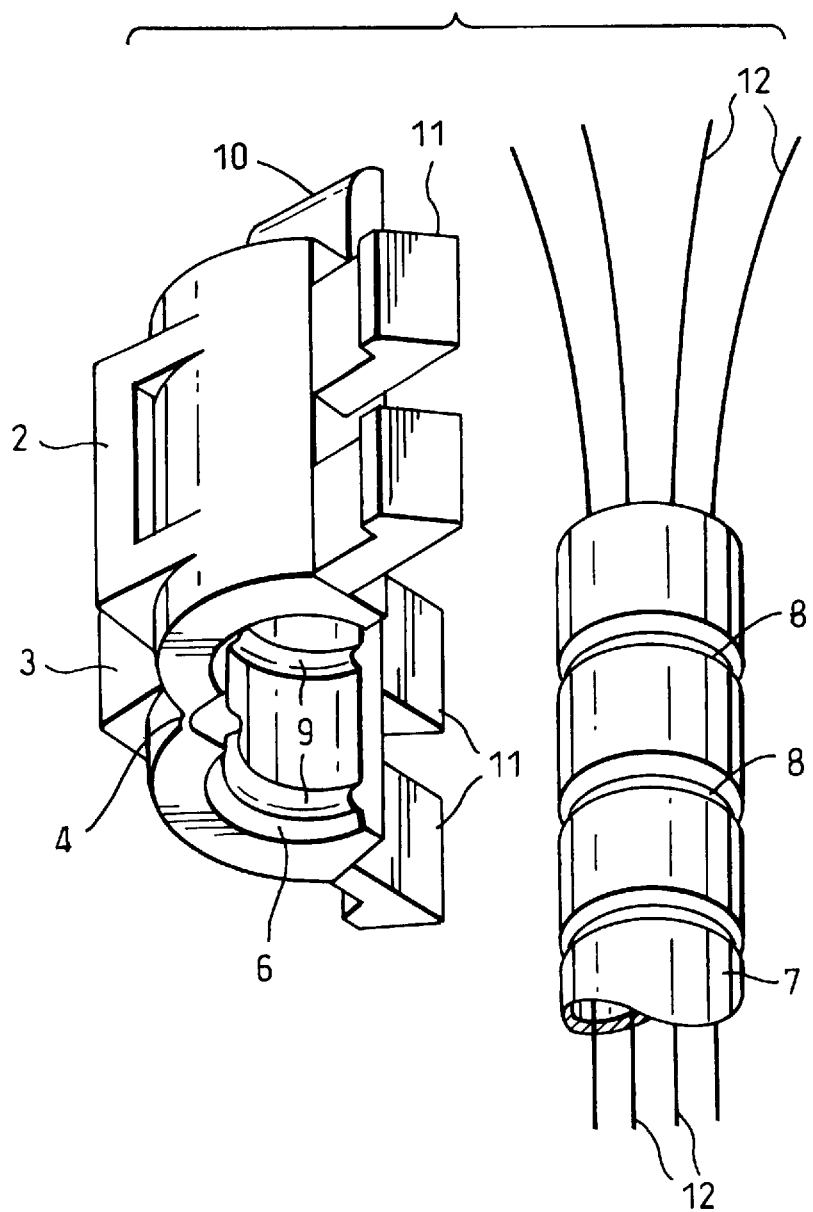
FIG. 1 is a perspective view of a device according to the invention prior to attachment to the tube.
Figure 2:
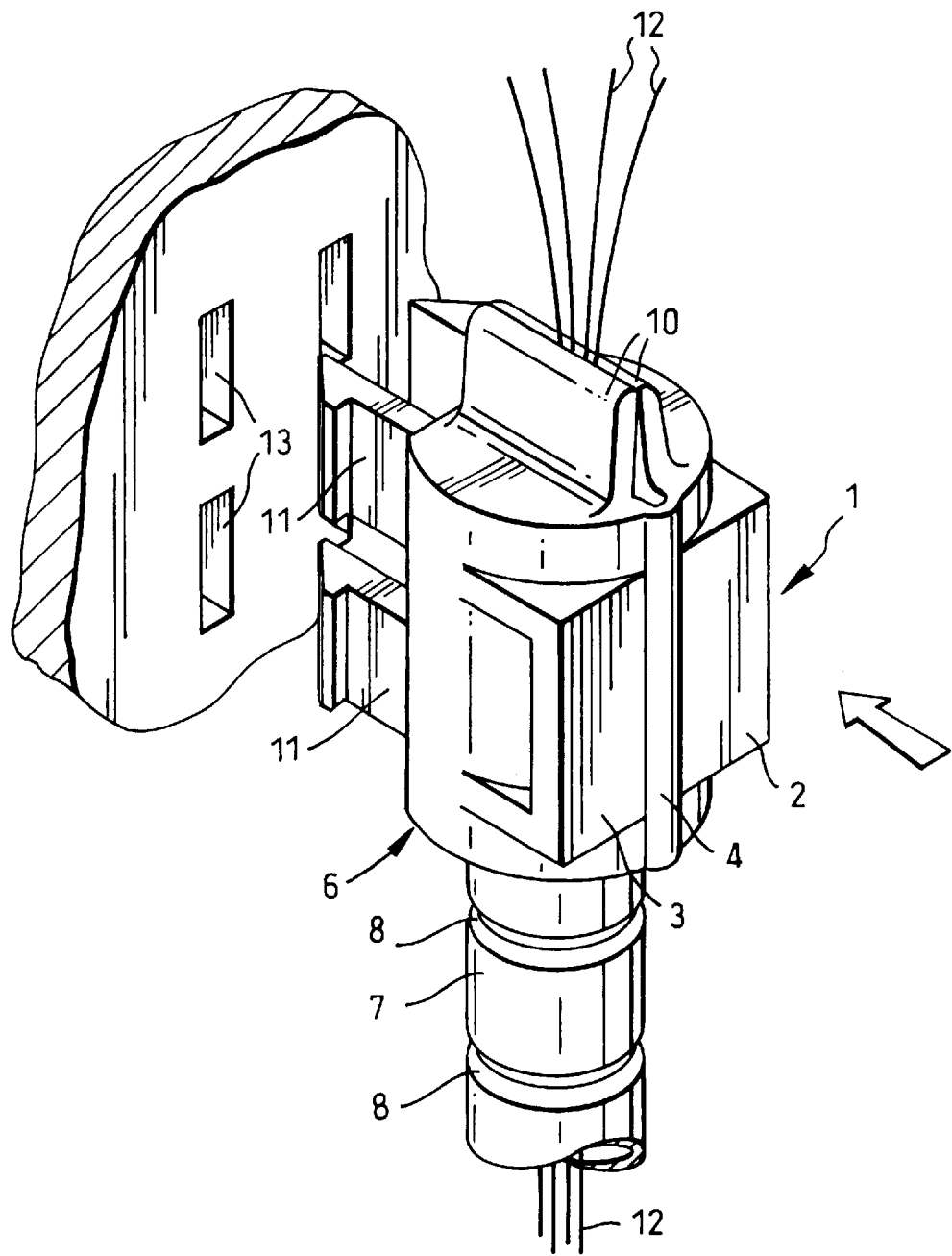
FIG. 2 is the same view as FIG. 1, but showing the device in use.

Referring to FIGS. 1 and 2 an optical fibre clamping device 1 is integrally formed as a one piece plastics material moulding. The device is of generally cylindrical shape and comprises two substantially identical halves 2, 3 connected by a hinge part 4 extending longitudinally along the device. The interior of the device is hollow and defines a through passageway 5. One end of the device 6, the lower most as shown, is dimensioned to receive an optical fibre protective tube 7 and to provide a means of clamping the device to that tube 7. As shown the tube 7 includes axially spaced grooves 8 and the device includes co-operating ridges 9 to prevent the device being pulled away from the tube.

A pair of jaws 10 are provided at the other end of the device 1. In addition each body half 2, 3 includes a pair of lugs 11, the reasons for which will be described later on.

In use the device 1 is opened up to the condition shown in FIG. 1 clamped around the tube and optical fibre arrangement such that the internal ridges 9 engage in grooves 8 on the tube and the jaws 10 engage the optical fibres 12, as is shown in FIG. 2. The lugs 10 are then inserted into corresponding recesses 13 in an optical fibre organiser 14 which holds the device 1 together. Because of the engagement of the lugs 11 in the recesses 13 and the clamps 6 and 10 to the tube 7 and optical fibre 12 respectively any relative movement between the optical fibre 12 and tube 7 and the optical fibre organiser 14 is prevented.

What we claim is:

1. A device for preventing relative movement between an optical fibre and a tube within which the optical fibre is located with clearance relative to the tube, comprising: a body part including a through passageway to receive the optical fibre, the body part including a first clamp to engage the tube and a second clamp to engage the optical fibre.

2. A device according to claim 1 in which the body part is a one piece molding comprising two portions connected by a hinge and arranged such that movement of the two portions causes the respective clamps to engage the tube and the optical fibre.

3. A device according to claim 1 in which the body part includes means for mounting the device to an optical fibre organizer.

4. A device according to claim 3 in which, when mounted, the means are also arranged to hold the respective clamps in engagement.

5. A device according to claim 1 in which the first clamp and the tube include a cooperating groove and ridge arrangement.

6. A device according to claim 4 in which the mounting means comprises one or more, lugs to cooperate with corresponding recesses in the optical fibre organizer.

* * * * *